United States Patent [19]

Becher et al.

[11] 3,928,432
[45] Dec. 23, 1975

[54] PROCESS FOR PREPARATION OF 2-METHOXY-3,6-DICHLORO-BENZOIC ACID

[75] Inventors: Heinz Manfred Becher, Bingen (Rhine); Richard Sehring, Ingelheim am Rhein, both of Germany

[73] Assignee: Celamerck GmbH & Co. KG, Ingelheim am Rhein, Germany

[22] Filed: June 19, 1974

[21] Appl. No.: 480,685

[30] Foreign Application Priority Data

June 22, 1973 Germany............................ 2331712

[52] U.S. Cl...... 260/521 H; 260/523 A; 260/521 B; 204/73 R; 204/59
[51] Int. Cl.$^2$......................................... C07C 65/02
[58] Field of Search........ 260/521 H, 521 B, 523 A; 204/73 R, 59

[56] References Cited
UNITED STATES PATENTS

| 2,587,666 | 3/1952 | Toland............................ 260/523 A |
|---|---|---|
| 3,013,062 | 12/1961 | Richter............................ 260/521 H |
| 3,677,916 | 7/1972 | Seiber et al....................... 204/73 R |
| 3,687,826 | 8/1972 | Seiber............................. 204/73 R |
| 3,694,332 | 9/1972 | Parker et al....................... 204/73 R |
| 3,715,390 | 2/1973 | Croce et al....................... 260/523 A |

*Primary Examiner*—Lewis Gotts
*Assistant Examiner*—D. R. Phillips
*Attorney, Agent, or Firm*—Hammond & Littell

[57] ABSTRACT

An improved method of preparing 2-methoxy-3,6-dichloro-benzoic acid which comprises the step of oxidizing 2-methoxy-3,6-dichloro-benzyl alcohol into the correspondingly substituted benzoic acid, where the improvement resides in that the said benzyl alcohol is prepared either by
a. electrolytically or catalytically de-brominating 2-methoxy-5-bromo-3,6-dichloro-benzyl alcohol, or
b. catalytically de-brominating 2-hydroxy-5-bromo-3,6-dichloro-benzyl alcohol, followed by methylation of the 2-hydroxyl substituent of the de-brominated benzyl alcohol.

5 Claims, No Drawings

PROCESS FOR PREPARATION OF 2-METHOXY-3,6-DICHLORO-BENZOIC ACID

This invention relates to novel processes for the preparation of 2-methoxy-3,6-dichloro-benzoic acid.

We have discovered that this compound which is a known herbicide, can unexpectedly be prepared in an advantageous manner by a. de-brominating 2-methoxy-5-bromo-3,6-dichloro-benzyl alcohol, or b. de-brominating 2-hydroxy-5-bromo-3,6-dichloro-benzyl alcohol and methylating the de-brominated compound at the 2-hydroxyl-group, and oxidizing the 2-methoxy-3,6-di-chlorobenzyl alcohol obtained by (a) or (b).

More particularly, the present invention relates to the following novel methods of preparing 2-methoxy-3,6-dichlorobenzoic acid.

METHOD A

Electrolytically or catalytically debrominating 2-methoxy-5-bromo-3,6-dichloro-benzyl alcohol to produce 2-methoxy-3,6-dichlorobenzyl alochol, oxidizing said 2-methoxy-3,6-dichlorobenzyl alcohol to produce 2-methoxy-3,6-dichlorobenzoic acid, and recovering said 2-methoxy-3,6-dichlorobenzoic acid.

METHOD B

Catalytically debrominating 2-hydroxy-5-bromo-3,6-dichloro-benzyl alcohol to produce 2-hydroxy-3,6-dichlorobenzyl alcohol, methylating said 2-hydroxy-3,6-dichlorobenzyl alcohol at the 2-hydroxyl group to produce 2-methoxy-3,6-dichlorobenzyl alcohol, oxidizing said 2-methoxy-3,6-dichlorobenzyl alcohol to produce 2-methoxy-3,6-dichlorobenzoic acid, and recovering said 2-methoxy-3,6-dichloro-benzoic acid.

The novel processes may be illustrated by reference to the following schematic reaction sequence:

Method A:

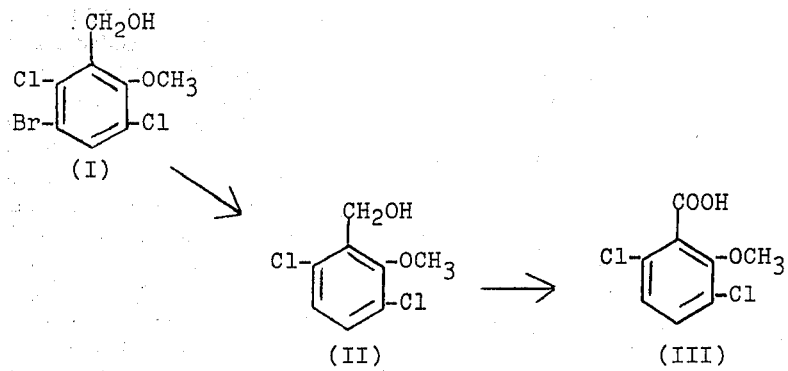

Method B:

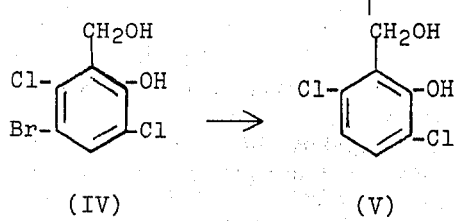

The debromination of compound I to compound II is effected electrolytically or catalytically, while the debromination of compound IV to compound V is preferably effected catalytically.

The starting compound I is readily available in accordance with conventional processes of preparation from 4-bromo-2,5-dichlorophenol by hydroxymethylation and methylation of the phenolic hydroxy group. The electrolytic debromination of compound I is effected in a vessel having a cathode compartment and an anode compartment which are separated by a diaphragm, for example, made of porous clay. The anode compartment is filled with a suitable electrolyte, preferably dilute aqueous sodium hydroxide solution or potassium hydroxide solution. An anode dips into this electrolyte. The anode is made from conductive material which is sufficiently inert under the electrolysis conditions; and the anode may consist of lead or graphite. The cathode compartment is filled with a protonic solvent, or with a mixture of solvents possessing a sufficient power of solution for the conducting electrolyte, as well as for the starting material of formula I. Suitable solvents are, for example, mixtures of water and lower alcohols, as well as organic solvents such as acetonitrile, dimethylformamide or dioxane. Examples of conducting electrolytes are strong bases, preferably alkali metal hydroxides, such as sodium hydroxide or potassium hydroxide.

The cathode is an electric conductor capable of providing a sufficiently high cathode potential, and is preferably made of copper. The cathode may be constructed from other metals, for example, nickel, tin, lead, zinc or mercury. The cathode potential can be influence, not only by the type of cathode material, but above all by the current density. Cathode potential and temperature are chosen in such a way that the bromine is split off sufficiently quickly, while the other substituent groups of the starting material are not attacked at all. Appropriately, the electrolysis is effected at a low temperature up to a slightly elevated temperature; and the rate of debromination is adjusted, when using a copper cathode, by changing the current density. The required cathode potential can be determined polarographically; however, it may be increased as well, starting from a low value, until the formation of ionic bromine can be proved analytically. An unnecessarily high cathode potential is to be avoided, in order not to impair the selectivity of the reaction.

The end of debromination may be determined analytically. Yet, it is practical as well to determine the progress of the reaction from the quantity of hydrogen developed and by the quantity of electricity used.

As the catalyst for the catalytic debromination from I to II in method A it is preferable to use palladium, especially in the form of palladium-on-charcoal. The solvent is, for example, methanol, preferably in a mixture with water or, optionally, with the addition of an acid acceptor, such as sodium acetate or sodium hydroxide. Inert organic solvents or mixtures of solvents can be used as the reaction medium, for example benzene or cyclohexane. In doing so, an acid acceptor such as sodium acetate is preferably added and, if required, the reaction is conducted under slightly elevated pressure.

The smooth course of the reaction in accordance with the present invention was not predictable or foreseeable, since undesired reactions, especially of the benzylalcoholic hydroxy group, were to be expected.

The first step of the reaction sequence of method B consists of the catalytic debromination of 2-hydroxy-5-bromo-3,6-dichloro-benzyl alcohol with hydrogen and a suitable hydrogenation catalyst. The second step is the methylation of the phenolic hydroxyl group, and the third step consists of the oxidation of the hydroxymethyl group to the carboxylic acid group.

The process step from IV to V is conducted as a normal pressure hydrogenation, preferably in the presence of palladium-on-charcoal as the catalyst. It is either effected in methanol optionally with the addition of water, or in weakly alkaline aqueous solution (pH 13). Other solvents may be used as the reaction medium as well, for example, benzene or cyclohexane; however, with the latter products of minor quality are obtained, in general.

The methylation of V to II in method B is carried out in accordance with known methods, for example, with dimethylsulfate.

The starting compound IV may be prepared according to U.S. Pat. No. 2,631,169 by means of hydroxymethylation of 2,5-dichloro-4-bromophenol with excess formalin in aqueous alkaline medium.

Oxidation of the benzyl alcohol of the formula II obtained according to method A or method B to the benzoic acid of the formula III readily proceeds by means of conventional oxidation agents, for example with potassium permanganate in a heated aqueous alkaline solution. Other oxidation agents, such as nickel peroxide, can be used as well. For the production of greater quantities of the acid, the preferred method of oxidation is with oxygen in the presence of a catalyst, for example finely dispersed platinum.

The following examples illustrate the present invention and will enable others skilled in the art to understand it more completely. It should be understood, however, that the invention is not limited solely to the particular examples given below.

EXAMPLE 1

2-Methoxy-3,6-dichlorobenzoic acid by Method A a. An electrolysis cell consisted of a glass beaker for holding the catholyte and a clay beaker filled with the anolyte, dipped therein, as the diaphragm. If required, the catholyte was cooled from the outside, while it was appropriate to cool the anolyte by a cooling coil. The cathode was a copper sheet with an area of 50 cm$^2$, and the anode was a lead sheet with an area of 50 cm$^2$. For the catholyte, a stirring device such as a magnetic stirrer was provided. A homogeneous solution of 10.0 gm (0.035 mol) of 2-methoxy-5-bromo-3,6-dichloro-benzyl alcohol and 12.5 gm of potassium hydroxide in 250 ml of methanol was filled into the cathode compartment of the electrolysis cell. Into the anode compartment was added so much aqueous 5% solution of potassium hydroxide that the surfaces of the two liquids were equal in height. The electrodes were completely covered. Then, while stirring, the solution in the cathode compartment was electrolyzed for 2 hours at each of the following currents: 2 A, 1.5 A, 1.0 A and 0.5 A (for a total of 8 hours time corresponding to 10 A h). The electrolysis cell was cooled in such a way that a temperature of 3° to 5°C was maintained in the cathode compartment.

Afterwards, 300 ml of water were added. From the mixture thus prepared the methanol was distilled off as far as possible under decreased pressure. The distillation residue was extracted twice, each time with 50 ml of diisopropyl ether. The combined extracts were dried. Then the solvent was distilled off. The crystalline residue was recrystallized from benzene (40° to 80°C).

The yield after recrystallizing once was 6.8 gm (94% of theory), of 2-methoxy-3,6-dichloro-benzyl alcohol, m.p. 66° to 68°C, Cl-value: 34.0% (theory 34.2%). According to NMR and mass spectroscopy the product was pure.

b. To a mixture of 10.35 gm (50 mmol) of 2-methoxy-3,6-dichlorobenzyl alcohol and 100 ml of 10% potassium hydroxide solution was added a solution of 10.6 gm (67 mmol) of potassium permanganate in 100 ml of water. The mixture thus prepared was heated to approximately 95°C while stirring it well; then stirring was continued at this temperature for 1½ hours. In doing so, the starting material dissolved and manganese dioxide precipitated. By means of centrifuging the manganese dioxide was separated from the aqueous solution, suspended with dilute potassium hydroxide solution and separated again by centrifuging. The aqueous phases were combined and adjusted strongly acid with concentrated hydrochloric acid. The product precipitated first in oil condition and then slowly became crystalline. It was vacuum filtered and dried.

The yield of crude product, m.p. 101° – 107°C was 10.8 gm (97% of theory). Titration with sodium hydroxide solution: equivalent = 224 (theory: equivalent = 221). Upon recrystallization from benzene-isopropylether-mixture (3 : 1), the yield was 9.0 gm (81% of theory), of 2-methoxy-3,6-dichlorobenzoic acid m.p. 107° – 108°C. Titration with sodium hydroxide solution: equivalent = 223. The results of the elemental analysis coincided with the theory.

EXAMPLE 2

2-Methoxy-3,6-dichlorobenzoic acid by Method A a. A homogeneous mixture of 20 gm (70 mmol) of 2-methoxy-3,6-dichloro-5-bromo-benzyl alcohol, 18 gm of caustic soda, 20 ml of water and 250 ml of methanol were poured into the cathode compartment of an electrolysis cell. The cathode consisting of copper was 5 cm high and 20 cm wide. Into the anode compartment was filled so much 6% sodium hydroxide solution that the surfaces of the two liquids were equal in height. The electrodes were completely covered. Then, while stirring, the solution in the cathode region was electrolyzed for 2 hours with 6 A and, subsequently, for one hour each with 5 A, 4 A and 3 A (for a total of 5 hours time corresponding to 24 A hours). The electrolysis cell was cooled in such a way that the temperature in the cathode compartment was approximately 23°C in the beginning, decreasing during electrolysis at 10°C.

Afterwards, 250 ml of water were added to the catholyte. The methanol of the mixture thus prepared was distilled off under decreased pressure as far as possible. The distillation residue was extracted three times, each time with 50 ml of diisopropylether. The combined extracts were dried. Then the solvent was distilled off. The remaining crude product became crystalline.

The crude yield was 14.2 gm (98% of theory), of 2-methoxy-3,6-dichloro-benzyl alcohol (crude product), m.p. 60° – 66°C. According to NMR and MS, this crude product still contained some starting material (less than 2%). The results of the elemental analysis corresponded to the theory.

b. To a mixture of 10.35 gm (50 mmol) of 2-methoxy-3,6-dichloro-benzyl alcohol and 200 ml of dilute sodium hydroxide solution, adjusted to pH 8, was added 1 gm of 5% platinum/charcoal. The mixture so prepared was heated to 90° to 95°C while stirring. Then, at this temperature, while stirring vigorously oxygen was introduced through a glass frit into the mixture. In doing so the pH-value decreased. If the pH dropped to 6.5, it was adjusted to 10 – 10.5 by the addition of 0.5 N sodium hydroxide solution. Each time that the pH had fallen to 8.5 enough sodium hydroxide solution was added to raise the pH again to 10 to 10.5.

The reaction was complete when the pH-value of the reaction mixture did not change any more. Then the reaction mixture was cooled to room temperature and the pH-value was adjusted to approximately 11. After about 1 hour it was vacuum filtered to remove the insoluble material, and was washed with approximately 0.1 N sodium hydroxide solution. The alkaline filtrate was extracted with isopropylether.

The aqueous phase was strongly acidified with concentrated hydrochloric acid (pH 2) and then extracted with isopropyl ether. The combined organic layers of this extraction were dried and evaporated. The oily residue was triturated with some benzene, and became crystalline. The yield was 8.3 gm (75% of theory), of 2-methoxy-3,6-dichlorobenzoic acid, m.p. 105° – 109°C.

Titration with sodium hydroxide solution against phenolphthalein: equivalent = 224 (theory = 221). The results of the elemental analysis corresponded to the theory. The starting material not reacted to produce the acid could be recovered for the most part.

EXAMPLE 3

2-Methoxy-3,6-dichlorobenzoic acid by Method B a. 2,5-dichloro-4-bromophenol was hydroxymethylated in alkaline aqueous solution with excess formalin at 40°C using a procedure analogous to that described in U.S. Pat. No. 2,631,169, to prepare 2-hydroxy-3,6-dichloro-5-bromo-benzyl alcohol.

b. In a solution of 45 gm of sodium hydroxide in 1 liter of water, 244 gm (0.90 mol) of 2-hydroxy-3,6-dichloro-5-bromo-benzyl alcohol were dissolved. Subsequently, while stirring at 50°C, 142 gm (1.13 mol) of dimethylsulfate were added in the course of 1 hour. Then, the reaction mixture which became weakly acid was adjusted alkaline by the addition of sodium hydroxide solution, and cooled off. The product that crystallized out was vacuum filtered, washed with dilute sodium hydroxide solution and water, and dried. The yield was 168 gm (65% of theory) of 2-methoxy-3,6-dichloro-5-bromo-benzyl alcohol, m.p. 84° – 88°C (melting point after recrystallization from benzene [b.p. 40° – 80°C]: 88° – 90°C). By means of acidification of the alkaline layer the unreacted phenol starting compound could be recovered (35%).

c. (1) A solution of 14.3 gm (0.05 mol) of 2-methoxy-3,6-dichloro-5-bromobenzyl alcohol in a mixture of 200 ml of methanol and 50 ml of water was hydrogenated after the addition of 2 gm of 5% palladium/charcoal at normal pressure at 15° to 20°C. Then, the catalyst was vacuum filtered and washed with water. The methanol of the filtrate was distilled off in vacuo. The residue was twice extracted, each time with 50 ml of diisopropyl ether. The combined extracts were dried and evaporated to dryness in vacuo. The residue, which was first oily, became crystalline. The yield was 9.6 gm (99% of theory) of 2-methoxy-3,6-dichlorobenzyl alcohol m.p. 62° – 66°C. According to the NMR-spectrum the product was pure. The results of elemental analysis corresponded to the theory.

c. (2) A solution of 71.5 gm (0.25 mol) of 2-methoxy-3,6-dichloro-5-bromobenzyl alcohol in a mixture of 300 ml of methanol and 75 ml of water was hydrogenated after the addition of 3 gm of 5% palladium/charcoal at normal pressure at 30° – 45°C. After about one-third of the theoretical quantity of hydrogen has been reacted, a solution of 7.5 gm (0.188 mol) of sodium hydroxide in a mixture of 12.5 ml of water and 62 ml of methanol was added dropwise. The rate of dosing dropwise was adjusted in accordance with the rate of hydrogenation; the quantity of base was kept below that needed for neutralization. The residue was extracted twice with 200 ml of diisopropyl ether. The combined extracts were dried and evaporated to dryness in vacuo. The residue crystallized gradually. The yield was 50.5 gm (98% of theory) of 2-methoxy-3,6-dichlorobenzyl alcohol, m.p. 62° – 66°C. According to the NMR-spectrum the product was pure. The results of elemental analysis corresponded to the theory.

d. To a mixture of 10.35 gm (50 mmol) of 2-methoxy-3,6-dichlorobenzyl alcohol and 200 ml of water, adjusted to pH 8 with dilute sodium hydroxide solution, was added 1 gm of platinized asbestos, and the mixture was heated to 90° – 95°C while stirring. At this temperature, oxygen was introduced into the mixture through glass frit, while stirring. In doing so the pH-value decreased. When it has dropped to 6.5, it was adjusted to 10 – 10.5 by the addition of 0.5 N sodium hydroxide solution. Then, when the pH-value had dropped to 8 again, each time 0.5 N sodium hydroxide solution was added so that the pH-value again reached to 10 to 10.5. The reaction was finished when the pH-value of the reaction mixture did not change any more. Then the reaction mixture was cooled to room temperature and the pH-value was adjusted to approximately 11. After about 1 hour, the insoluble matter, (catalyst and neutral organic substances), was vacuum filtered and washed with approximately 0.1 N sodium hydroxide solution. The alkaline filtrate was extracted with diisopropyl ether in order to remove neutral, organic substance. The aqueous layer was strongly acidified (pH 2) with concentrated hydrochloric acid and then extracted with diisopropyl ether. The combined organic layers of this extraction were dried and evaporated. The oily residue was triturated with a small amount of benzene, whereby it became crystalline. The yield was 7.1 gm (64% of theory) of 2-methoxy-3,6-dichlorobenzoic acid, m.p. 105° - 108°C. Titration with sodium hydroxide solution; equivalent = 224 (theory = 221). The results of elemental analysis corresponded to the theory. The portions of the starting material which did not oxidize to the final product could be recovered and reused for the most part.

EXAMPLE 4

2-Methoxy-3,6-dichlorobenzoic acid by Method B a. 2,5-dichloro-4-bromophenol was hydroxymethylated in alkaline aqueous solution with excess formalin at 40°C using a procedure analogous to that described in U.S. Pat. No. 2,631,169 to produce 2-hydroxy-3,6-dichloro-5-bromobenzyl alcohol.

b. (1) A solution of 27.2 gm (0.10 mol) of 2-hydroxy-3,6-dichloro-5-bromobenzyl alcohol in 300 ml of sodium hydroxide solution containing 0.10 ml of sodium hydroxide, was hydrogenated at normal pressure after the addition of 2 gm of 5% palladium/charcoal at 10° to 20°C. During the reaction 1 N sodium hydroxide solution was added dropwise so that the pH-value of the reaction mixture remained between 10 and 12. When the theoretical quantity of sodium hydroxide solution (0.10 mol of sodium hydroxide) has been added dropwise and the pH-value had dropped to 10, the hydrogenation was terminated. Subsequently, the catalyst was separated by centrifuging; the aqueous solution was brought to pH 2 to 3 with hydrochloric acid and extracted twice, each time with 150 ml of diisopropyl ether. The combined extracts were dried and evaporated. The residue became crystalline. The yield was 18.6 gm (96% of theory) of 2-hydroxy-3,6-dichloro-benzyl alcohol, m.p. 64° – 67°C.

b. (2) A solution of 68 gm (0.25 mol) of 2-hydroxy-3,6-dichloro-5-bromobenzyl alcohol in a mixture of 100 ml of methanol and 25 ml of water was hydrogenated at normal pressure after the addition of 3 gm of 5% palladium/charcoal at 35° to 45°C. After reaction of the theoretical quantity of hydrogen, the rate of reaction decreased distinctly. At this time, hydrogenation was terminated. Then the catalyst was vacuum filtered and it was washed with water. The methanol of the filtrate was distilled off in vacuo after addition of 200 ml of water. The residue was extracted twice, each time with 200 ml of diisopropyl ether. The combined extracts were dried and evaporated. The residue became crystalline. The yield was 46.5 gm (96% of theory) of 2-hydroxy-3,6-dichlorobenzyl alcohol, m.p. 65° – 68°C.

The 2-hydroxy-3,6-dichloro-benzyl alcohol prepared according to (b) (1) or (b) (2) above contained approximately 5 to 10% monochloro-2-hydroxy-benzyl alcohol.

c. Into a solution of 19.3 gm (0.10 mol of the crude product prepared according to (b) (1) or (b) (2) above) of 2-hydroxy-3,6-dichlorobenzyl alcohol in 150 ml of 1 N sodium hydroxide solution (0.15 mol of sodium hydroxide), 18.9 gm (0.15 mol) of dimethylsulfate was added dropwise at 50° – 55°C while stirring in the course of 2 hours. Stirring was then continued for one hour at 55° to 60°C. Afterwards the reaction mixture, which became weakly acid, was adjusted alkaline by the addition of sodium hydroxide solution, cooled off and extracted twice, each time with 100 ml of diisopropyl ether. The combined extracts were dried and evaporated in vacuo. The residue, oily at first, became crystalline. The yield was 15.2 gm (73% of theory) of 2-methoxy-3,6-dichlorobenzyl alcohol, m.p. 59° – 61°C. The crude product was purified by recrystallization.

By acidifying the alkaline-aqueous phase 26% of the 2-hydroxy-3,6-dichlorobenzyl alcohol used could be recovered.

Using a procedure analogous to that described in Example 3 (d), 2-methoxy-3,6-dichlorobenzoic acid was prepared by oxidation of 2-methoxy-3,6-dichlorobenzyl alcohol.

While the present invention has been illustrated with the aid of certain specific embodiments thereof, it will, be readily apparent to others skilled in the art that the invention is not limited to these particular embodiments, and that various changes and modifications may be made without departing from the spirit of the invention or the scope of the appended claims.

We claim:

1. A process for the preparation of 2-methoxy-3,6-dichlorobenzoic acid comprising the steps of
   electrolytically debrominating 2-methoxy-5-bromo-3,6-dichlorobenzyl alcohol to produce 2-methoxy-3,6-dichlorobenzyl alcohol,
   oxidizing said 2-methoxy-3,6-dichlorobenzyl alcohol to produce 2-methoxy-3,6-dichlorobenzoic acid, and
   recovering said 2-methoxy-3,6-dichlorobenzoic acid.

2. The process of claim 1, in which said debromination is effected electrolytically within an alkaline medium.

3. The process of claim 1, in which said debromination is effected electrolytically in an electrolysis cell having an anode compartment zone and a cathode compartment zone, said zones being separated by a diaphragm during electrolysis.

4. The process of claim 3, in which said cathode compartment zone contains a cathode made of copper.

5. The process of claim 1, in which said oxidation is effected with oxygen in the presence of a catalyst.

* * * * *